(12) United States Patent
Haviv et al.

(10) Patent No.: US 8,365,280 B2
(45) Date of Patent: Jan. 29, 2013

(54) SYSTEM, METHOD, AND PROGRAM FOR DETERMINING VALIDITY OF STRING

(75) Inventors: Yinnon Avraham Haviv, Haifa (IL); Marco Pistoia, Amawalk, NY (US); Naoshi Tabuchi, Miyagi (JP); Takaaki Tateishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 12/825,610

(22) Filed: Jun. 29, 2010

(65) Prior Publication Data

US 2010/0333201 A1    Dec. 30, 2010

(51) Int. Cl.
*G06F 11/00* (2006.01)
(52) U.S. Cl. .......................................... 726/22; 726/23
(58) Field of Classification Search .............. 726/22–26; 713/187–188
See application file for complete search history.

(56) References Cited

U.S. PATENT DOCUMENTS

| | | | |
|---|---|---|---|
| 7,240,332 B2 | 7/2007 | Berg et al. | |
| 7,392,545 B1 | 6/2008 | Weber et al. | |
| 7,398,516 B2 | 7/2008 | Berg et al. | |
| 7,398,517 B2 | 7/2008 | Berg et al. | |
| 7,530,101 B2 | 5/2009 | Gallo et al. | |
| 7,530,107 B1 | 5/2009 | Ono et al. | |
| 7,617,489 B2 | 11/2009 | Peyton et al. | |
| 7,661,097 B2 | 2/2010 | Mukkavilli | |
| 7,849,509 B2 | 12/2010 | Venkatapathy et al. | |
| 7,853,987 B2 * | 12/2010 | Balasubramanian et al. | 726/2 |
| 7,937,692 B2 | 5/2011 | Drepper | |
| 7,975,257 B2 | 7/2011 | Fanning et al. | |
| 7,987,451 B1 | 7/2011 | Dalcher | |
| 8,166,532 B2 * | 4/2012 | Chowdhury et al. | 726/9 |
| 2004/0260940 A1 | 12/2004 | Berg et al. | |
| 2005/0108562 A1 | 5/2005 | Khazan et al. | |
| 2006/0150160 A1 | 7/2006 | Taft et al. | |
| 2006/0277539 A1 | 12/2006 | Amarasinghe et al. | |
| 2007/0016894 A1 | 1/2007 | Sreedhar | |
| 2007/0083933 A1 | 4/2007 | Venkatapathy et al. | |
| 2007/0088740 A1 | 4/2007 | Davies et al. | |
| 2007/0150869 A1 | 6/2007 | Tateishi et al. | |
| 2008/0244536 A1 | 10/2008 | Farchi et al. | |
| 2008/0270993 A1 | 10/2008 | Tateishi et al. | |
| 2011/0072517 A1 | 3/2011 | Tripp | |

(Continued)

FOREIGN PATENT DOCUMENTS

JP    2007052625    3/2007
WO   2008047351 A2  4/2008

OTHER PUBLICATIONS

Christensen, et al., "Precise Analysis of String Expressions", In SAS'03 Proceedings of Int'l Static Analysis Symposium, vol. 2695 of LNCS, pp. 1-18, 2003.

(Continued)

*Primary Examiner* — Hosuk Song
(74) *Attorney, Agent, or Firm* — Cantor Colburn LLP; Gail Zarick

(57) ABSTRACT

A computer-implemented method, program product, and system for determining the validity of a string generated by a computer programming language program. The method includes: abstracting a constraint between variables extracted from a source code for a programming language, describing the constraint in M2L, and storing the constraint; and evaluating the validity of the string on an M2L solver on the basis of the constraint and a M2L specification to determine whether the string is safe or unsafe.

9 Claims, 4 Drawing Sheets

U.S. PATENT DOCUMENTS

2011/0087892 A1 4/2011 Haviv et al.
2011/0131656 A1 6/2011 Haviv et al.
2011/0321016 A1 12/2011 Haviv et al.

OTHER PUBLICATIONS

Minamide, "Static approximation of dynamically generated Web pages," Proceedings of the 14th Int'l Conference on World Wide Web, pp. 432-441, 2005.

Wassermann, et al., "Sound and precise analysis of web applications for injection vulnerabilities," PLDI'07 Proceedings of Programming Language Design & Implementation, 2007.

Engelfriet, et al., MSO definable string transductions and two-way finite-state transducers, ACM Transactions on Computational Logic, vol. 2, Issue 2 (Apr. 2001) pp. 216-254.

Moller, et al., "The pointer assertion logic engine," ACM SIGPLAN vol. 36, Issue 5 (May 2001) pp. 221-231.

Benjamin Livshits, "Improving Software Security with Precise Static and Runtime Analysis," Dissertation submitted to the department of computer science and the committee on graduate studies of Stanford University in partial fulfillment of the requirements for the degree of doctor of philosophy, Nov. 2006, pp. 1-250.

Emmanuel Geay, et al., "Modular String-Sensitive Permission Analysis with Demand-Driven Precision," ICSE-09, IEEE, pp. 177-187; May 2009.

James Harvey, "A Static Secure Flow Analyzer for a Sub-set of Java," US Naval Post-Graduate School, Thesis, Mar. 1998, pp. 1-98.

Pietraszek, Tadeusz, et al., "Defending Against Injection Attacks Through Context-Sensitive String Evaluation," Lecture Notes in Computer Science (Incuding subseries Lecture Notes in Artificial Intelligence and Lecture Notes in Bioinformatics); vol. 3858 LNCS (2006) pp. 124-145, Recent Advances in Intrusion Detection—8th International Symposium, RAID (2005), Revised Papers.

* cited by examiner

SYSTEM, METHOD, AND PROGRAM FOR DETERMINING VALIDITY OF STRING

CROSS-REFERENCE TO RELATED APPLICATIONS

This application claims priority under 35 U.S.C. §119 to Japanese Patent Application No. 2009-155705 filed Jun. 30, 2009, the entire contents of which are incorporated by reference herein.

BACKGROUND OF THE INVENTION

1. Field of the Invention

The present invention relates to a technique for determining the validity of a string in a computer program code.

2. Description of the Related Art

As the Internet traffic increases, security risk has also increased. A typical risk is a cross-site scripting (XSS) attack, in which an attacker injects a malicious script across sites into web pages dynamically generated by an application program. Another risk is an SQL injection attack, in which an attacker injects an SQL statement into an existing SQL statement, causing the execution of the SQL statement, which is not expected by the application, to manipulate a database system in an unauthorized manner. To detect the XSS risk in a CGI program, for example, it is necessary to check whether a character '<' is passed to a print function.

Japanese Patent Application Publication No. 2007-52625 discloses a system for constructing a parse tree by analyzing a source code to be tested by parsing means. In this published application, vulnerability detection means creating a dynamic inter-parameter transition database by following the parse tree. In addition, the system traces the transition of an external input in the source code to be tested from the inter-parameter transition database and gives a warning of a vulnerable portion, which matches a content registered in a vulnerability database containing functions vulnerable when an external input is used as a parameter. While the technique disclosed in the published application relates to testing the vulnerability of a source code, it pertains to the transition of an external input and does not pertain to a value of a string generated by a program.

Non-patent documents Christensen, et al., "Precise Analysis of String Expressions", In SAS'03 Proceedings of Int'l Static Analysis Symposium, Vol. 2695 of LNCS, pp. 1-18, Springer-Verlag 2003 (hereinafter Christensen), Minamide, "Static approximation of dynamically generated Web pages," Proceedings of the 14th int'l conference on World Wide Web table, pp. 432-441, 2005 (hereinafter Minamide), and Wassermann, et al., "Sound and precise analysis of web applications for injection vulnerabilities," In PLDI'07 Proceedings of Programming Language Design and Implementation, 2007 (hereinafter Wassermann) disclose a static program analysis technique for inferring a value of a string generated at run time without executing a program. Typically, the static program analysis technique is used to detect security vulnerability by abstracting a string value using grammar (regular grammar or context-free grammar) and comparing the inferred string value with a safe or unsafe pattern prepared in advance.

A grammar-based approach, however, is limited in that it is difficult to modularize. Furthermore, the grammar-based approach is difficult to use for a retrospective analysis or to handle a relationship between a string index and a string value. For example, the string analysis in Minamide depends on transformations of the context-free grammar. Therefore, to modularize the string analysis in Minamide, it is necessary to calculate the composition of the transformations and to reverse the transformations to use the string analysis in for the retrospective analysis. In this manner, the modularized analysis and the retrospective analysis require an additional algorithm in an inference phase of the string analysis.

On the other hand, handling the characteristics of a string can be performed by using the monadic second-order logic (M2L) approach. According to the M2L approach, it is possible to perform the composition by using a simple logic operation (for example, ∧) without using any particular algorithm. A BDD-based algorithm for solving a M2L formula contributes to solving a problem of combinatorial explosion. MONA is an example of a program for solving M2L. The program is available at http://www.brics.dk/mona. An encoding method for a regular expression is described in Chapter 6.6 at http://www.brics.dk/mona/publications.html.

The technique described in Engelfriet, et al., "MSO definable string transductions and two-way finite-state transducers," ACM Transactions on Computational Logic, Vol. 2, Issue 2 (April 2001) pp. 216-254 solves the problem of string concatenation or the reverse if the string operation in the program can be defined or approximated by a string conversion definable by the monadic second-order logic (MSO). From the viewpoint of the static program analysis, however, this paper does not include any description of an algorithm for abstracting a program by using M2L.

There are other ways of verifying a program using M2L such as the technique described in Moller, et al., "The pointer assertion logic engine," ACM SIGPLAN Vol. 36, Issue 5 (May 2001) pp. 221-231.

The above-described techniques, however, do not deal with the verification of a value of a string generated by a program.

SUMMARY OF THE INVENTION

It is an object of the present invention to provide a technique for efficiently determining the validity of a string generated by a computer programming language program without actually executing the program.

According to an aspect of the present invention, a computer-implemented method is provided for determining the validity of a string generated by a computer programming language program without executing the program. The method includes: abstracting a constraint between variables extracted from a source code for a programming language, describing the constraint in M2L, and storing the constraint; and evaluating the validity of the string on an M2L solver on the basis of the constraint and a M2L specification to determine whether the string is safe or unsafe.

According to another aspect of the present invention, a computer program product is provided for determining the validity of a string generated by a computer programming language program without executing the program. The computer program product includes computer program instructions stored on a readable storage medium. When the instructions are executed, a computer will perform the steps of the method described above.

According to still another aspect of the present invention, a computer-implemented system is provided for determining the validity of a string generated by a computer programming language program without executing the program. The system includes: a computer storage unit; an abstraction unit for abstracting a constraint on variables extracted from a source code for a programming language; a specification preparation unit for preparing a specification containing a string value with a safe or unsafe pattern in M2L; and a string evaluation unit for evaluating the validity of the declared string to determine whether the declared string is safe or unsafe.

DETAILED DESCRIPTION OF PREFERRED EMBODIMENTS

Figure 1:
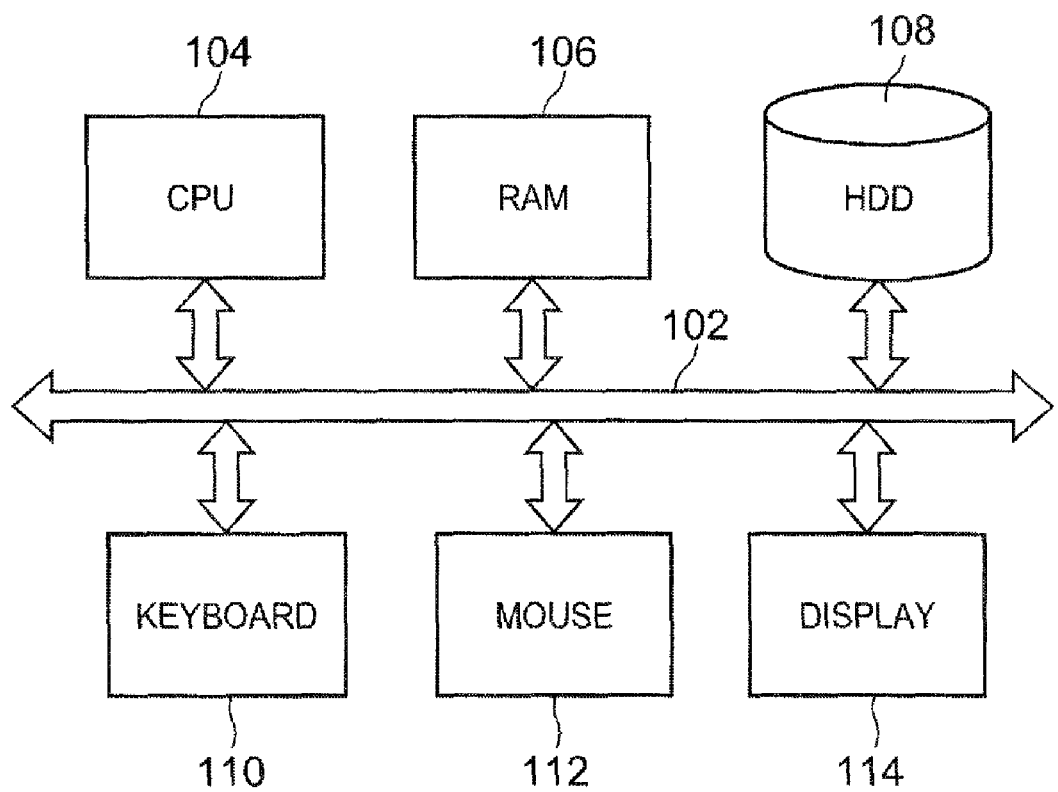
FIG. 1 is a block diagram of a hardware configuration according to embodiments of the present invention.

Hereinafter, preferred embodiments of the present invention will be described in detail in accordance with the accompanying drawings. Unless otherwise specified, like reference numerals denote like elements throughout the drawings. It is to be understood that the following description is merely illustrative of the embodiments of the present invention and is not intended to limit the present invention to the contents described in the embodiments.

The embodiments of the present invention utilize a string analysis technique based on the monadic second-order logic (M2L). M2L is expressive enough to define a regular language by using a second-order variable.

A built-in string operation is abstracted by describing the constraints between program variables using the expressiveness of M2L. Accordingly, all kinds of built-in string operations are modeled by the constraints on the input values and output values thereof. Once the entire program is converted into M2L, a determination is made as to whether the program whether the specification is satisfied, which is also described in M2L, by means of an M2L solver.

First, a string is expressed by a position set. In this process, information on the order of characters is not lost. Concatenation of two strings is expressed by a union of sets of two position sets $S_1$ and $S_2$. Note that all positions of the position set $S_1$ are less than all positions of the position set $S_2$. Subsequently, instructions are converted into M2L predicate declarations. Each of the M2L predicate declarations represents a property of all possible strings that are assigned to a corresponding variable at run time. Afterwards, an instruction related to a cyclic variable (a variable defined by itself) is converted into a regular grammar (or regular expression) through a conversion from terminal symbols corresponding to non-cyclic variables to M2L predicates with the non-cyclic variable considered as the terminal symbols. Thereafter, a sound abstraction of a built-in string function is defined by a constraint between input and output string values. In the definition, a parameter corresponding to the input string is abstracted by a higher-order variable and each higher-order variable is instantiated by the M2L predicate generated from the program.

The analysis method is enhanced by a function of handling string indices, wherein each string index is encoded by a pair of a position and a position set. Moreover, the analysis method is enhanced in a labeling function by using an additional bit. Furthermore, it is possible to handle branch conditions for enhancing the analysis method.

Referring to FIG. 1, a block diagram shows a computer hardware for achieving a system configuration and processing according to one embodiment of the present invention. In FIG. 1, a system bus 102 is connected to a CPU 104, a main memory (RAM) 106, a hard disk drive (HDD) 108, a keyboard 110, a mouse 112, and a display 114. The CPU 104 is preferably based on a 32-bit or 64-bit architecture. For example, Pentium™ 4, Core™ 2 Duo, or Xeon™ of Intel Corporation, Athlon™ of Advanced Micro Devices, Inc., or the like can be used. The main memory 106 preferably has a capacity of 2 GB or more.

Although not individually shown, the hard disk drive 108 stores an operating system. The operating system can be an arbitrary one that is compatible with the CPU 104, such as Linux™, Windows XP™ or Windows™ 2000 of Microsoft Corporation, or Mac OS™ of Apple Computer.

The hard disk drive 108 can also store a programming language processor such as C, C++, C# and Java™, if necessary. The hard disk drive 108 can further include a text editor for writing source codes to be compiled by the programming language processor and a development environment such as Eclipse™.

The hard disk drive 108 further stores MONA, which is a M2L solver. MONA is available at http://www.brics.dk/mona/download.html. The hard disk drive 108 can also further store a tool for converting a Java™ source code into a static single assignment (SSA) form. The tool is available at, for example, http://wala.sourceforge.net/.

The keyboard 110 and the mouse 112 are used to launch a program (not shown), which is loaded into the main memory 106 from the operating system or the hard disk drive 108 and displayed on the display 114, and also used to type characters.

The display 114 is preferably a liquid crystal display, and a display having an arbitrary resolution, such as XGA (1024×768 resolution) or UXGA (1600×1200 resolution), can be used. Although not shown, the display 114 is used to display a program check result.

Embodiments of the present invention allows for the generation of M2L formulae which represent constraints between program variables. The variables in the formulae correspond to the program variables, in M2L. According to the embodiments of the present invention, it is possible to automatically find an interpretation of whether the variables satisfy the constraint by using a theorem solver such as MONA (http://www.brics.dk/mona/). In other words, there is no need to consider the transformation of a string value abstracted by a grammar as in the grammar-based string analysis.

If it is possible to find an interpretation satisfying a formula obtained by the combination of a program and its specification, the program potentially satisfies the specification. In this manner, the formula is satisfied under any interpretation, the program always satisfies the specification (forward analysis). Otherwise, a counterexample not satisfying the specification is obtained. Further, a string value of the program variable satisfying the specification is obtained (backward analysis).

Forward Analysis

First, consideration will be given to the following Java™ program:
```
String a="a";
String b="b";
String s;
if (flag) {s=a+b;}
else {s=b+a;}
System.out.println(s);
```

The following predicate declaration of Prog can be generated from the above program:

$$\text{Prog}(V_a, V_b, V_s) \equiv \text{``a''}(V_a) \wedge \text{``b''}(V_a) \wedge (\text{concat}(V_s, V_a, V_b) \vee \text{concat}(V_s, V_b, V_a))$$

Here, it is assumed that $V_a$, $V_b$, and $V_s$ intuitively represent variables. "c"(P) is a predicate which is true if the string represented by P is c. concat(R,P,Q) is a predicate which is true if the string represented by R is generated by a concatenation of strings represented by P and Q.

If it is assumed here that a string "<" is an unsafe string, the safety specification of the program is as follows:

$$\text{Spec}(V_s) \equiv \forall P \subseteq V_s, \neg \text{``<''}(P)$$

Then, it is possible to find that the program satisfies the specification by checking the following formula:

$$\text{Prog}(V_a, V_b, V_s) \Rightarrow \text{Spec}(V_s)$$

where $V_a$, $V_b$, and $V_s$ are free variables.

If the value of a program variable b comes from the outside of the program, the following constraint is obtained without using a subexpression of the program variable b:

$$\text{Prog'}(V_a, V_b, V_s) \equiv \text{``a''}(V_a) \wedge (\text{concat}(V_s, V_a, V_b) \vee \text{concat}(V_s, V_b, V_a))$$

Thus, a counterexample such as "<"($V_b$) is obtained by checking Prog'($V_a, V_b, V_s$) $\Rightarrow$ Spec($V_s$).

Backward Analysis

If the string value is unknown, it is possible to generate a formula for finding a value of the variable b satisfying the specification (constraint). Prog'($V_a, V_b, V_s$) $\wedge$ Spec($V_s$)

Encoding of String and Built-in Function in M2L

In M2L, the position of a string value and a subset of positions can be directly described using a first-order variable and a second-order variable, respectively. In the encoding technique of the embodiments of the present invention, a finite string is considered as a heap. It satisfies the M2L formula generated from the program and the specification. Strings constructed in the program can be represented by position sets of the heap. For example, assuming that there is a heap string "abcabc," position sets {0,2} and {2,5} represent strings "ac" and "cc," respectively. Each character in the heap can be represented by a bit vector in the case of a method of encoding M2L(Str)[5] in M2L. To express a one-byte character, eight second-order variables $B_0, \ldots, B_7$ are required, where $B_i$ includes a position of a character whose $i^{th}$ bit is 1.

Therefore, a predicate "a"(P) representing a character "a" is expressed as follows by using eight second-order variables $B_0, \ldots, B_7$:

$$\text{``a''}(P) \equiv \exists\, p \in P. \qquad [\text{Eq. 1}]$$
$$\{p\} = P$$
$$\wedge\, p \in B_0 \wedge p \notin B_1 \wedge p \notin B_2 \wedge p \notin B_3$$
$$\wedge\, p \notin B_4 \wedge p \in B_5 \wedge p \in B_6 \wedge p \notin B_7$$

According to the above encoding method, the string concatenation predicate can be defined as follows:

$$\text{concat}(R,P,Q) \equiv R = P \cup Q \wedge (\forall p, q. p \in P \wedge q \in Q \Rightarrow p < q)$$

Other string operations are defined in M2L in the same manner.

Figure 2:
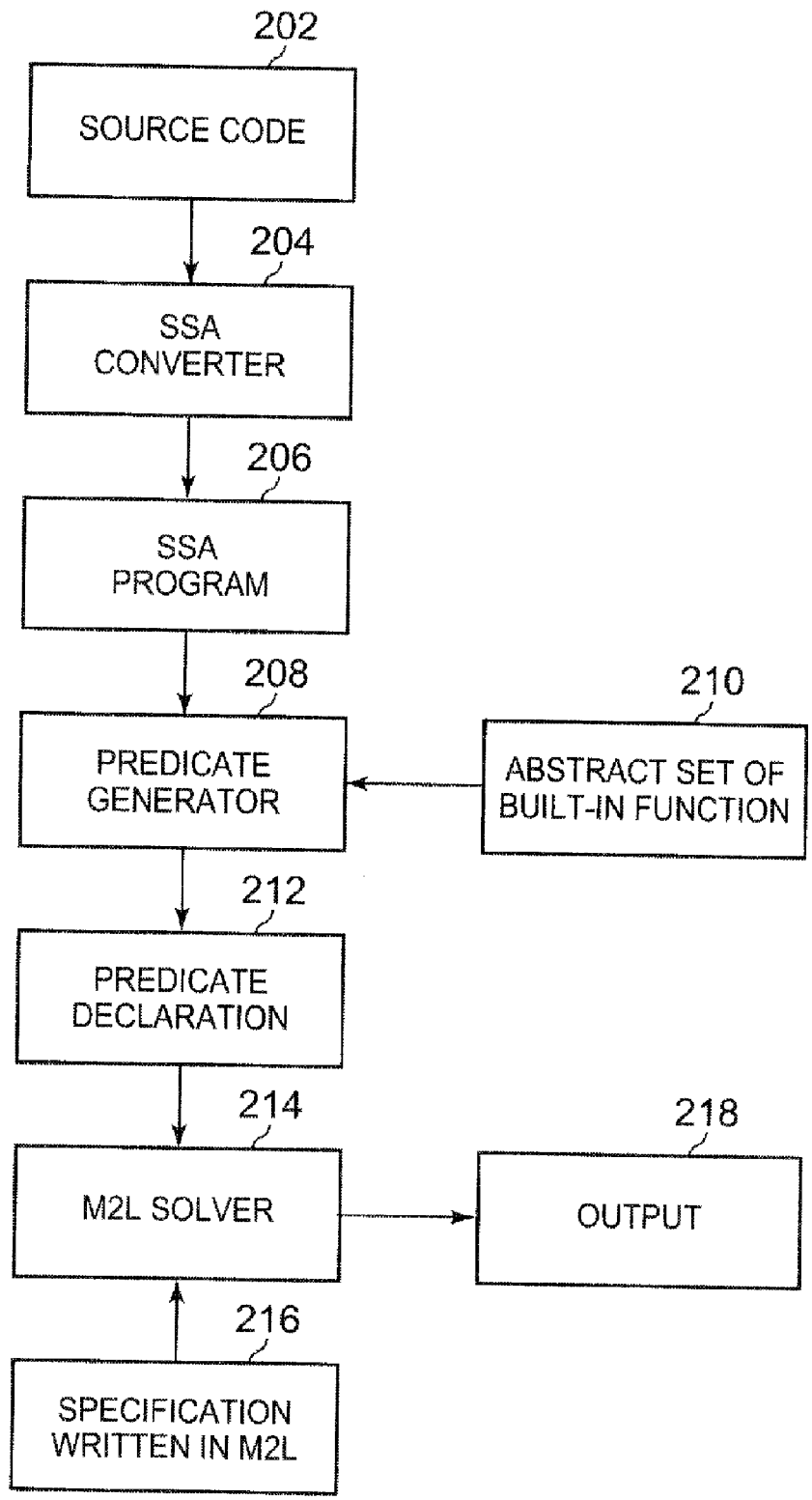
FIG. 2 is a diagram illustrating a functional block diagram for performing processing according to embodiments of the present invention.

Referring to FIG. 2, the functional block of the processing according to an embodiment of the present invention will be described. First, a source code 202 is typically a Java source code and generally stored in a text file format in the hard disk drive 108.

A SSA converter 204 has a function of converting a Java source code into a SSA-format file 206 in this embodiment. The tool is available, for example, at http://wala.sourceforge.net/. SSA means a static single assignment, which is an intermediate representation where a subscript is appended thereto so that the definition of each variable is textually unique. It is suited for visibly performing dataflow analysis and optimization in compilers.

There are SSA converters capable of coping with source codes for various programming languages such as C and C++ other than Java. In this embodiment, it is also possible to handle the source codes for languages other than Java by installing those SSA converters.

The SSA program 206 converted in this manner can be stored once into the hard disk drive 108 or it can be loaded into the main memory 106.

The predicate generator 208 has a function of reading the SSA program 206 and the file describing an abstract set of built-in functions 210 to generate predicate declarations 212 to be processed by a M2L solver 214. The file describing an abstract set of a built-in function 210 has content prepared in advance and preferably is stored in the hard disk drive 108.

The predicate generator 208 can be written in an arbitrary programming language such as C, C++, C#, Java™, Perl, Ruby, or Python. The program of the predicate generator 208 is stored in the hard disk drive 108 and is loaded into the main memory 106 and executed by the action of the operating system in response to a keyboard operation or the like.

The predicate declaration 212 converted in this manner can be stored once into the hard disk drive 108 or it can be loaded into the main memory 106. The generated predicate declarations 212 are preferably read into the M2L solver 214 along with a constraint file 216 that is previously written in M2L by a user and stored in the hard disk drive 108. The processing result is displayed in a format of an output 218 of the display 114. The M2L solver 214 is preferably MONA, though not limited thereto, and is available at http://www.brics.dk/mona/download.html.

Outline of Algorithm of the Embodiments of the Present Invention

The following will be described with reference to flowcharts shown in FIGS. 3 and 4. As described above, inputs to be verified are a SSA program Prog, a target variable $x_t$, and a specification (Spec). The Spec potentially represents a property of a string assigned to the program variable $x_t$.

Figure 3:
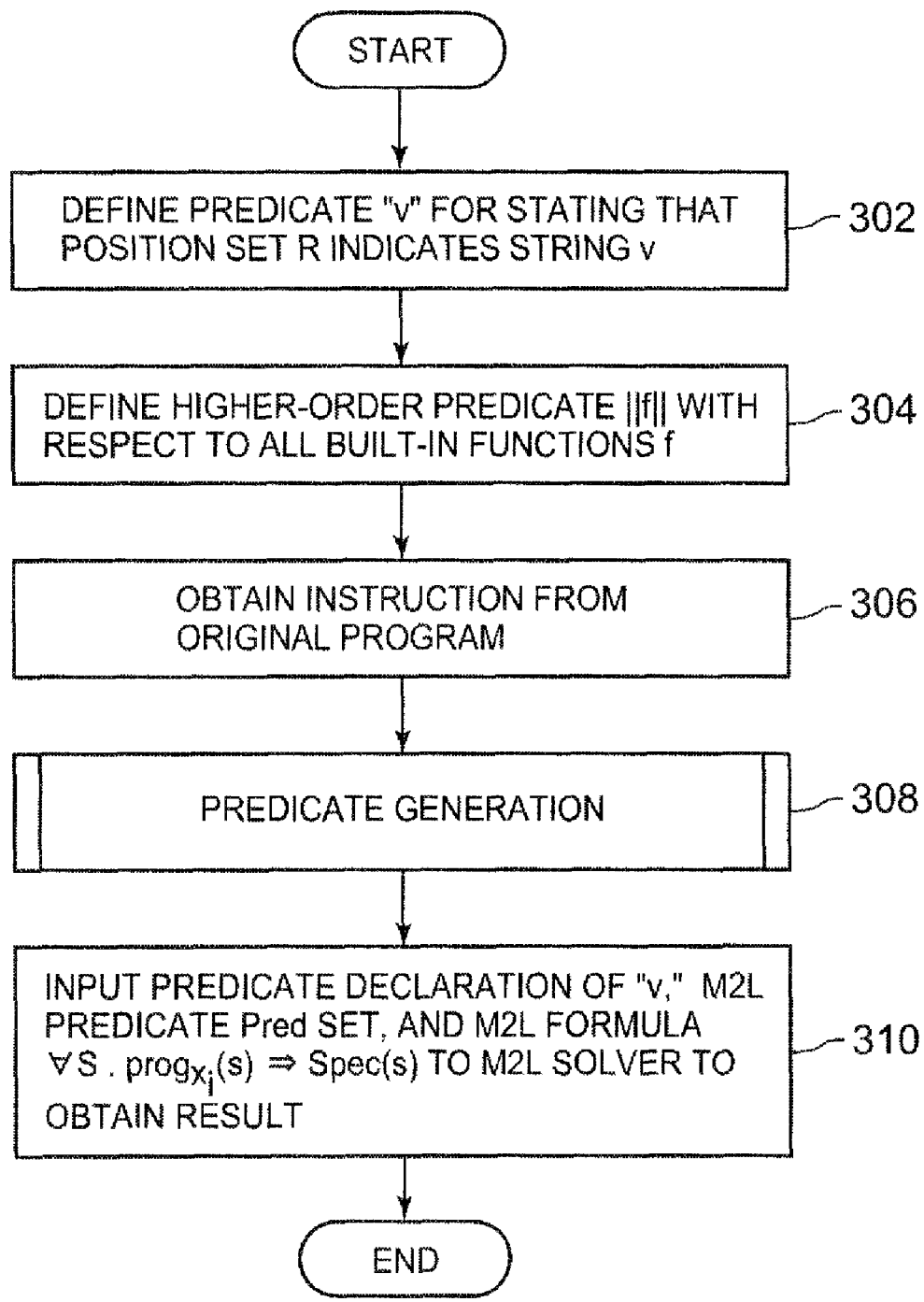
FIG. 3 is a diagram illustrating a general flowchart of the entire processing according to embodiments of the present invention.

In FIG. 3, the first step 302 is a preparation step of defining a predicate "v" for stating that a position set R indicates a string v without losing the order of characters so that the concatenation of two strings is represented by a union set of two position sets $S_1$ and $S_2$. Note that all positions of the position set $S_1$ are less than all positions of the position set $S_2$.

The next step 304 is also a preparation step, in which a higher-order predicate ||f|| is defined for all built-in functions f so that ||f||(R,"$v_1$",...,"$v_n$") holds for all input string values $v_1, \ldots, v_n$ and a position set R representing return values of $f(v_1, \ldots, v_n)$.

The next step 306 is also a preparation step of obtaining an instruction related only to strings. If there is any other type of instruction, it is also possible to abstract that instruction from the original program.

The next step 308 relates to the predicate generator 208. As shown in detail in the flowchart of FIG. 4, M2L predicate declarations are generated by converting all instructions in the program Prog into predicate declarations as described below.

Figure 4:
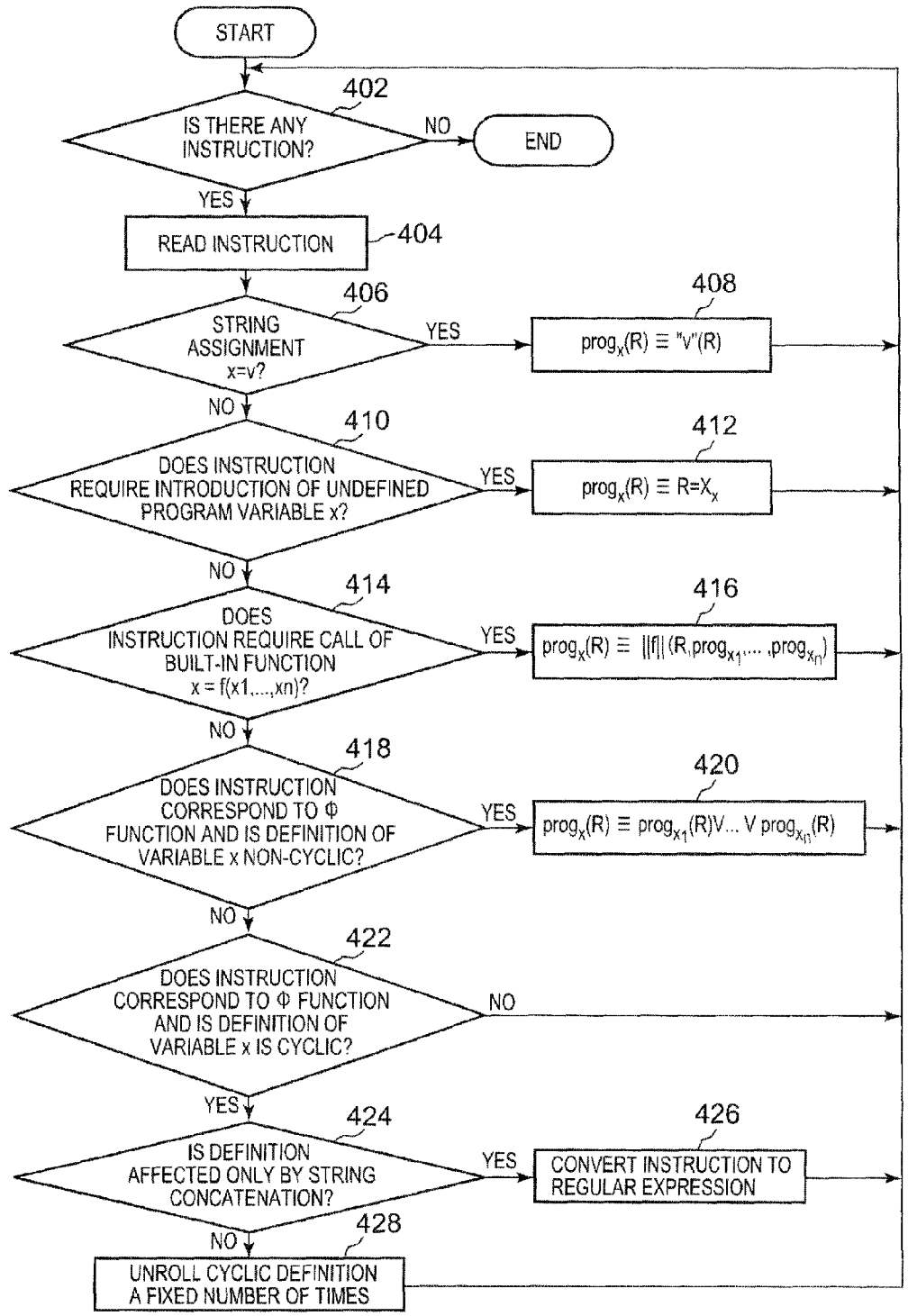
FIG. 4 is a diagram illustrating a flowchart of processing performed by a predicate generator according to embodiments of the present invention.

Specifically, in FIG. 4, the predicate generator 208 determines that there is still an instruction to be read in step 402, and thereupon reads the instruction in step 404.

If the predicate generator 208 determines that the instruction is a string assignment x=v in step 406, the predicate generator 208 converts it to $prog_x(R) \equiv "v"(R)$.

If the predicate generator 208 determines that the instruction is an introduction of an undefined program variable x in step 410, the predicate generator 208 converts it to $prog_x(R) \equiv R = X_x$ in step 412. Note that $X_x$ is a free variable corresponding to the program variable x.

If the predicate generator 208 determines that the instruction is a call of a built-in function $x=f(x_1, \ldots, x_n)$ in step 414, the predicate generator 208 converts it to a declaration $prog_x(R) \equiv \|f\|(R, prog_{x1}, \ldots, prog_{xn})$ in step 416. Note that $\|f\|(R, prog_{x1}, \ldots, prog_{xn})$ is obtained by instantiating the higher-order predicate $\|f\|$ using the variable R and the predicate $prog_{x1}, \ldots, prog_{xn}$.

If the predicate generator 208 determines that the instruction is a Φ-instruction $x=\Phi(x_1, \ldots, x_n)$ and that the definition of the variable x is non-cyclic in step 418, the predicate generator 208 converts it to a declaration $prog_x(R) \equiv prog_{x1}(R) \lor \ldots \lor prog_{xn}(R)$ in step 420.

If the instruction is a Φ-instruction $x=\Phi(x_1, \ldots, x_n)$ and the definition of the variable x is cyclic in step 422, the predicate generator 208 performs processing as described below.

If the predicate generator 208 determines that the definition is affected only by the concatenation of strings in step 424, the predicate generator 208 considers a non-cyclic variable to be a terminal symbol and constructs a M2L predicate declaration $prog_x$ representing a regular grammar, where the non-cyclic variable is converted to the corresponding M2L predicate to convert the instruction related to the variable into the regular grammar (or regular expression).

Otherwise, the predicate generator 208 unrolls the cyclic definition a fixed number of times in step 428 or uses a technique of automatically finding a loop invariant.

Upon completion of processing of one instruction in this manner, the control returns to step 402. If there is still an instruction to be processed, the predicate generator 208 reads the instruction in step 404 and repeats the processing of the step 406 and subsequent steps. Otherwise, the predicate generator 208 terminates the processing and returns to the processing of the flowchart in FIG. 3.

Returning to FIG. 3, step 310 is used to describe the use of the theorem prover (the M2L solver). In this step, a predicate declaration of "v," a M2L predicate set Pred, and a M2L formula $\forall S \cdot prog_{xt}(S) \Rightarrow Spec(S)$ are input to the M2L solver. The result is then obtained from the M2L solver. The theoretical detail of the background of the present invention will be described below.

Program

The program is represented in the SSA form. For information on SSA, refer to the following literatures: Rosen, et al., "Global value numbers and redundant computations," Proceedings of the 15th ACM SIGPLAN-SIGACT symposium on Principles of programming, pp. 12-27, 1988; Cytron, et al., "Efficiently computing static single assignment form and the control dependence graph," ACM Transactions on Programming Languages and Systems (TOPLAS) archive, Vol. 13, Issue 4 (Oct. 1991).

An abstract syntax of SSA is as follows:
x∈X
n∈N
v∈V
x'::=x|¬x|⊥(bot)
s::=x=v statement
|x=undefined
|x=f($x_1, \ldots, x_n$)
|x=Φ($x_1, \ldots, x_n$)
b::=(n,{s}) basic block
N::={b} basic block set
E::={(b, b, x')} edge set
G::=(N, E') program (control flow graph)

x∈X and v∈V represent a variable and a value, respectively. n∈N is an identifier of a basic block. (n,{s}) is a basic block composed of a basic block identifier n and a instruction set {s}.

E is an edge set represented by two basic blocks b and a condition x' where the condition is represented by a variable, a negation of a variable, or a special value bot. An SSA instruction is a constant value assignment (x=v), a function call (x=f($x_1, \ldots, x_n$)) or a Φ function (x=Φ($x_1, \ldots, x_n$)). The basic block b is a series of statements without any branch and loop. The control flow such as a branch or a loop is represented as an edge of a control flow graph g.

Monadic Second-Order Logic

The monadic second-order logic is used on a string representing a constraint between variables. An abstract syntax of M2L(str) is as follows:

$$p \in \text{Var1 where Var1 is a first-order variable set} \quad [\text{Eq. 2}]$$
$$P \in \text{Var2 where Var2 is a second-order variable set}$$
$$t ::= 0 | p | t + i | t - i \text{ where } i \text{ is a natural number.}$$
$$T ::= \emptyset | \text{all} | P | T \cup T | T \cap T | T \setminus T | T^{-1}$$
$$\phi ::= 'a'(t) \text{ It is true if a character in } a \text{ position}$$
$$\text{represented by } t \text{ is } 'a.'$$
$$| t = t | t < t | t \leq t$$
$$| T = T | T \subset T | T \subseteq T | t \in T$$
$$| \neg \phi | \phi \land \phi | \phi \lor \phi | \phi \Rightarrow \phi | \phi \Leftrightarrow \phi$$
$$| \exists p.\phi | \forall p.\phi | \exists P.\phi | \forall P.\phi$$

The following predicate is used throughout the embodiment of the present invention, where "a"(P) indicates that a string represented by P is a:

$$concat(R, P, Q) \equiv R = P \cup Q \quad [\text{Eq. 3}]$$
$$\land (\forall p, q. p \in P \land q \in Q \Rightarrow p < q)$$
$$"a(P)" \equiv \exists p.\{p\} = P \land 'a'(p)$$
$$"a_0 a_1 \ldots a_n"(P) \equiv \exists P_0,$$
$$P_1, \ldots, P_n, P'_0, P'_1, \ldots, P'_{n-2}.$$
$$\land \ "a_0"(P_0) \land "a_1"(P_1)$$
$$\land \ \ldots \ \land "a_n"P_n$$
$$\land \ concat(P'_0, P_0, P_1)$$
$$\land \ concat(P'_1, P'_0, P_2)$$
$$\ldots$$
$$\land \ concat(P, P'_{n-2}, P_n)$$

-continued $$strr(R, P, p, q) \equiv p < q \wedge R \subseteq P$$
$$\wedge \forall r.r \in P \Rightarrow (r \in R \Leftrightarrow p \leq r \wedge r < q)$$
$$subtrr(R, P, p, q) \equiv p < q \wedge R \subseteq P$$
$$\wedge \forall r.r \in P \Rightarrow (r \in R \Rightarrow p \leq r \wedge r < q)$$
$$subtrr(R, P) \equiv substrr(R, P, \min(R), \max(R) + 1)$$

The core of the algorithm will be described below.

Built-in Function Abstraction

The abstraction of a built-in function is previously defined by a M2L predicate. More specifically, the abstraction of a built-in function f is represented by a symbol ||f||. Built-in function parameters are implicitly represented by higher-order variables and can be replaced by predicates. Each higher-order variable is supposed to be instantiated by a predicate, which represents a property of a string value assigned to the corresponding built-in function parameter, at the time of abstracting instructions.

In this regard, consideration will be given to a remove(s,x) function for removing all occurrences of a string specified by x from strings specified by s. For the strings, ||remove|| is defined as follows where $P_s$ and $P_x$ are higher-order variables and R, S, and X are second-order variables.

$$||\text{remove}||(R, P_s, P_x) \equiv$$
$$\exists S, X'. P_s(S)$$
$$\wedge (\forall x.(x \in X' \Leftrightarrow \exists X.x \in X \wedge substr(X, S) \wedge P_x(X)))$$
$$\wedge (R = S \setminus X')$$
[Eq. 4]

For string concatenation, the following abstraction is employed:

$$||\text{concat}||(R, P_1, P_2) = \exists P_1, P_2. P_1(P_1) \wedge P_2(P_2) \wedge \text{concat}(R, P_1, P_2)$$
[Eq. 5]

For a replace function replace(s,x,y) for replacing an appearance of y in the string x with z, the following abstraction is employed:

$$||\text{replace}||(R, P_s, P_x, P_y) \equiv$$
$$\exists S, X', Y', P_s(S)$$
$$\wedge (\forall x.(x \in X' \Leftrightarrow \exists X.x \in X \wedge substr(X, S) \wedge P_x(X)))$$
$$\wedge (\forall y.(y \in Y' \Leftrightarrow \exists Y.y \in Y \wedge substr(Y, R) \wedge P_y(Y)))$$
$$\wedge (R \setminus Y' \subseteq S \setminus X')$$
[Eq. 6]

To make the analysis sound, the abstraction of a function f needs to satisfy the following property:

$$\forall r, p_1, \ldots, p_n. r = f(p_1, \ldots, p_n)$$
$$\Rightarrow \forall w, I, \phi_1, \ldots, \phi_n.$$
$$p_1 \in L_{w,I}(\phi_1) \wedge \ldots \wedge p_n \in L_{w,I}(\phi_n)$$
$$\Rightarrow \exists w'. r \in L_{ww',I}(\lambda R.||f||(R, \phi_1, \ldots, \phi_n))$$
[Eq. 7]

ww' represents the concatenation of the finite string w and w'. $L_{w,I}(\psi)$ is a set of strings represented by $\psi$. It is formally defined as follows, where $w,I \models \psi$ denotes that the formula $\psi$ holds for the finite string w and the assignment I:

$$L_{w,I}(\psi) \equiv \{s | w, I \models \forall R \cdot \text{"}s\text{"}(R) \Rightarrow \psi(R)\}$$
[Eq. 8]

Abstraction of Variable and Instruction

An abstracted instruction is a declaration of the M2L predicate. If there is no cyclic definition of variables, the variables and instructions are abstracted as follows:

$$||x:=v|| \rightarrow \text{prog}_x(R) = \text{"}v\text{"}(R) \quad ||x:=\text{undefined}|| \rightarrow \text{prog}_x(R) \equiv R = X_x \text{ where } X_x \text{ is a free variable. } ||x:=f(x_1, \ldots, x_n)|| \rightarrow \text{prog}_x(R) \equiv ||f||(R, \text{prog}_{x_1}, \ldots, \text{prog}_{x_n}) \quad ||x:=\phi(x_1, \ldots, x_n)|| \rightarrow \text{prog}_x(R) \equiv \text{prog}_{x_1}(R) \vee \ldots \vee \text{prog}_{x_n}(R)$$
[Eq. 9]

Note that the abstraction of each instruction s is recursively defined without explicitly introducing predicate declarations as shown below, where def(x) is to return an instruction for defining the variable x.

$$||x:=v|| \rightarrow \lambda x \cdot \text{"}v\text{"}(x) \quad ||x:=\text{undefined}|| \rightarrow \lambda x \cdot x = X_x \text{ where } X_x \text{ is a free variable. } ||x:=f(x_1, \ldots, x_n)|| \rightarrow \lambda x \cdot ||f||(x, ||\text{def}(x_1)||, \ldots, ||\text{def}(x_n)||) \quad ||x:=\phi(x_1, \ldots, x_n)|| \rightarrow \lambda x \cdot ||\text{def}(x_1)|| \vee \ldots \vee ||\text{def}(x_n)||(x)$$
[Eq. 10]

If the variable on the left side of the Φ-instruction is defined by itself, the variable is called a cyclic variable. The cyclic variable appears only in analyzing a program with a loop or recursion.

If the value of the cyclic variable is affected only by string concatenation, a context-free grammar is constructed with respect to the cyclic variable, first, as described in Minamide, and approximated by a regular language. The regular language is encoded, which represents possible string values taken by the cyclic variable, in M2L. The encoding of the regular language is same as one described in Chapter 6.6 at http://www.brics.dk/mona/publications.html except that predicates corresponding to program variables for non-cyclic variables, which can be considered as terminal symbols, are used.

The following is the definition of the encoding, where T is a terminal symbol representing a character, $T_x$ represents a terminal symbol corresponding to a program variable x, and variables N, $N_1$, and $N_2$ represent non-terminal symbols:

$$||T|| \rightarrow \lambda S. 'T'(S)$$
$$||T_x|| \rightarrow \lambda S. \text{prog}_x(S)$$
$$||N_1 N_2|| \rightarrow \lambda S. \exists S_1,$$
$$S_2. ||N_1||(S_1) \wedge ||N_2||(S_2) \wedge \text{concat}(P, S_1, S_2)$$
$$||N_1 | N_2|| \rightarrow \lambda S. ||N_1||(S) \vee ||N_2||(S)$$
$$||N^*|| \rightarrow \lambda S. \exists P. \min(S) \in P \wedge \max(S) + 1 \in P$$
$$\wedge \forall r, r', Q. \text{consecutive}(r, r', P)$$
$$\wedge strr(Q, S, r, r') \Rightarrow ||N||(Q)$$
where
$$\text{consecutive}(p.q.R) \equiv$$
$$p < q \wedge p \in R \wedge q \in R \wedge (\forall r.p < r \wedge r < q \Rightarrow r \notin R)$$
[Eq. 11]

Otherwise, such a program is translated into a loop-free program by unrolling it a fixed number of times, or a loop invariant for the cyclic variable is searched using a technique described later.

Abstraction of Basic Block and Control Flow

Since a flow and a condition are not considered for this analysis. The abstraction of basic blocks and control-flow is straightforward as follows:

$$\|b\| \to \bigcup_{s \in S} \{\|s\|\} \text{ where } b=(n \cdot s) \quad \|(N,E)\| \to \bigcup_{b \in N} \|b\| \quad [\text{Eq. 12}]$$

Extensions and variations will be described below.

Interprocedural Analysis

While only an analysis in a procedure has been described hereinabove, it is possible to extend the analysis easily to an interprocedural analysis. For a description of the algorithm, a callgraph syntax is defined, first, as follows:

m∈M
N'::={(m, g)}
E'::={((m, g),(m, g))}
D::={((x, m),{(x, m)})}
cg::={(N', E', D)}

M is a set of names of callgraph nodes. cg is a callgraph, where N' is a set of callgraph nodes which contains pairs of the node names and control-flow graphs, E' is a set of edges of a callgraph, and D is a set of direct data dependencies of parameters and return values caused by function calls.

$((x,m), \{(x_1,m_1), \ldots, (x_n,m_n)\}) \in D$ represents the values of the variables $x_1, \ldots, x_n$ in the corresponding callgraph nodes $m_1, \ldots, m_n$ flow to the variable x of the callgraph node m.

If there is no recursive call here, the abstraction of the callgraph is defined as follows:

$$\|E'\| \to \bigcup_{((m_1,g_1),(m_2,g_2)) \in N'} \|g_1\|^{m_1} \cup \|g_2\|^{m_2} \quad [\text{Eq. 13}]$$

$$\|D\| \to \bigcup_{((x,m),\{(x_1,m_1),\ldots,(x_n,m_n)\}) \in D}$$
$$\{prog_{x,m}(E) \equiv prog_{x_1,m_1}(R) \vee \ldots \vee prog_{x_n,m_n}(R)\}$$

$$\|(N', E', D)\| \to \|E'\| \cup \|D\|$$

The node name is propagated to the instruction abstraction in order to annotate a predicate generated from the callgraph node.

Labeled String Analysis

Labeled string analysis is a variation of string analysis, in which each character has additional information such as taintedness. That label can be represented by using an additional bit. For example, one byte character is represented by nine bits if it is required to express a tainted character or an untainted character.

Condition-Sensitive String Analysis

The following abstraction is used for condition-sensitive analysis:

$$\|x\| \to X_x \text{ where } X_x \text{ is a second-order} \quad [\text{Eq. 14}]$$
variable corresponding to a variable x.

$$\|x := v\|^{(\pi,b)} \to prog_x(\|x\|) \equiv "v"(\|x\|)$$

$$\|x := \text{undefined}\|^{(\pi,b)} \to prog_x(\|x\|) \equiv \|x\| = X_x$$
where $X_x$ is a free variable.

$$\|x := f(x_1, \ldots, x_n)\|^{(\pi,b)} \to$$
$$prog_x(\|x\|) \equiv \|f\|(\|x\|, prog_{x_1}, \ldots, prog_{x_n})$$
$$\wedge \bigwedge_{i=1,\ldots,n} \pi(x_i, b)$$

$$\|x := \phi(x_1, \ldots, x_n)\|^{(\pi,b)} \to$$

-continued
$$prog_x(\|x\|) \equiv (\|x\| = \|x_1\|) \vee \ldots \vee$$
$$(\|x\| = \|x_n\|) \wedge \bigwedge_{i=1,\ldots,n} \pi(x_i, b)$$

$$\|b\| \to \bigcup_{s \in S} \|s\|^{(\pi,b)} \text{ where } b = (n, S)$$

$$\|(N, E)\| \to \bigcup_{b \in N} \|b\|$$

In the above, π indicates mapping from pairs of variables and basic blocks to constraints. The constraint asserts a specified variable used in a specified basic block, and it is supposed to be represented by M2L formulae. The mapping π can be calculated by the same method as described in U.S. Pat. No. 7,530,107.

Finding Loop Invariant

If there is a loop invariant $inv_x$ with respect to the cyclic variable x, it is possible to use the predicate for this predicate $inv_x$, instead of $prog_x$. To find such a loop invariant, a free (position set) variable $CS_x$ is introduced in order to represent a character set including all characters consisting of string values assigned the cyclic variable.

In this manner, the loop invariant $inv_x$ is defined as follows:

$$inv_x \equiv \text{construct}(R, CS_x)$$

where $\text{construct}(R,S) \equiv R \subset S$

The predicate $\text{construct}(R,S)$ states that a string value represented by the position set R contains characters of the position set S. Since $inv_x$ is a loop invariant, the following assumption is required to constrain $CS_x$:

$$\forall R \cdot prog_x(R) \Rightarrow inv_x(R)$$

Therefore, the program variable y having the specification $Spec_y$ is verified by the following expression:

$$(\forall R \cdot prog_x(R) \Rightarrow inv_x(R)) \Rightarrow (\forall R \cdot prog_y(R) \Rightarrow Spec_y(R))$$

The above expression is generalized as follows, where X is a set of cyclic program variables:

$$(\vee_{x \in X} \forall R \cdot prog_x(R) \Rightarrow inv_x(R)) \Rightarrow (\forall R \cdot prog_y(R) \Rightarrow Spec_y(R))$$

Regular Expression Operation

Similar to the typical method of encoding regular expression in M2L as described in http://www.brics.dk/mona/publications.html, regular expression pattern matching can be used for encoding a regular expression operation. The encoding method is the same as shown in Eq. 11. For example, the regular expression (ab)* can be expressed as follows:

$$\text{is\_ab\_star}(V) \equiv \exists R \cdot \min(V) \in R \wedge \max(V)+1 \in R \wedge \forall r,r',$$
$$S \cdot \text{consecutive}(r,r',R) \wedge \text{strr}(S,V,r,r') \Rightarrow \text{"ab"}(S)$$

Handling of String Index

An index can be encoded by a pair of a position and a position set. For example, if a program constant string "ace" is encoded by a position set {0,2,4} in M2L, the index 1 of the string "ace" is encoded by a pair (2,{0,2,4}).

Therefore, predicates $pos_0, \ldots, pos_n$, are introduced to express indices in M2L on the basis of the above encoding. Note that $pos_n(p,S)$ states that the position p in the position set S indicates an index n of a string corresponding to the position set S.

$$pos_0(p, S) \equiv pos_0(p, S) \quad [\text{Eq. 15}]$$
$$\vdots$$
$$pos_n(p, S) \equiv pos_{n-1}(p, S \setminus \min(S))$$

The IndexOf method in Java is abstracted as follows:

$$\|indexOf\|(n, P, P_1, P_2) \equiv \qquad [\text{Eq. 16}]$$
$$P_1(P) \wedge (\exists\, P_2.P_2(P_2) \wedge indexOf(n, PP_2))$$
$$\wedge\; (\forall\, P_2, m.P_2(P_2) \wedge indexOf(m, P, P_2) \Rightarrow n \le m)$$
where
$$indexOf(n, P, Q) \equiv$$
$$substr(Q, P)?$$
$$(Q \ne \varnothing?\min(Q) = n : \max(\$) + 1 = n)$$
$$: \max(\$) + 1 = n$$

In the above, the first parameter of $\|indexOf\|$ is a position and the second parameter represents a string including the position. In this manner, for a function call with a string index handled, a slightly different abstraction is employed.

For example, given the string operation substring(s,n,m) for extracting a substring between an index n and an index m of a string s, the string operation is abstracted as follows:

$$\|substring\|(R, P_s, P_n, P_m) \equiv \qquad [\text{Eq. 17}]$$
$$\exists\, S, n, m.$$
$$P(S) \wedge P_n(n, S) \wedge P_m(m, S) \wedge substr(R, S, n, m)$$

In view of the above example, an index replacement and a function call instruction are abstracted as follows:

$$\|x := n\| \to prog_x(\|n\|, S) \equiv pos_n(\|n\|, S) \qquad [\text{Eq. 18}]$$
$$\|x := f(x_1, \ldots, x_n)\| \to$$
$$prog_x(\alpha) \equiv \|f\|(\alpha, prog_{x_1}, \ldots, prog_{x_n})$$
where
$$\alpha = \begin{cases} \|x\|, S & \text{if } x \text{ is an index variable} \\ \|x\| & \text{if } x \text{ is a string variable} \end{cases}$$

Hereinafter, some examples will be described.

First, the following is a Java™ program for outputting a string value:

```
static public void main(String args[]){
  String uname = args[0];
  String group = args[1];
  if (group.equals("IBM")) {
    System.out.println(uname + "(IBM)");
  }else {
    uname = uname.replace("<","<");
    System.out.println(uname);
  }
}
```

The following is the SSA form of the above Java™ program:
$G=(N, E)$
$N=\{b_1, b_2, b_3, b_4\}$
$E=\{(b_1,b_2,v2), (b_1,b_3,\neg v2), (b_2, b_4), (b_3, b_4)\}$
$b_1=(1, BB_1)$
$b_2=(2, BB_2)$
$b_3=(3, BB_3)$
$b_4=(4, BB_4)$
$BB_1=$
  uname=undefined;
  group=undefined;
  v1="(IBM)";
  v2=equals(group,v1)
$BB_2=$
  v3=uname+v1;
  System.out.println(v3)
$BB_3=$
  v4="<";
  v5="lt;";
  v6=replace(uname,v4,v5);
  System.out.println(v6)
$BB_4=\phi$ A MONA predicate corresponding to the SSA form is obtained as follows:
pred prog_v1(var2 R)=
  ex2 c1,c2,c3,c4,c5 where is_lparen(c1) & is_I(c2) & is_B(c3) &
  is_M(c4) & is_rparen(c5):
  ex2 S1,S2,S3,S4,S5:
  S1=empty & concat(S2,c1,S1) & concat(S3,c2,S2) &
  concat(S4,c3,S3) & concat(S5,c4,S4) & concat(R,c5,S5);
pred prog_v2(var2 R)=
  ex2 P: prog_v1(P) & (R=P);
var2 uname;
var2 group;
pred prog_uname(var2 P)=P=uname;
pred prog_group(var2 P)=P=group;
pred prog_v3(var2 R)=
  ex2 P,Q: prog_uname(P) & prog_v1(Q) & concat(R, P, Q);
pred prog_v4(var2 R)=
  is_lt(R);
pred prog_v5(var2 R)=
  ex2 c1,c2,c3,c4 where is_amp(c1) & is_l(c2) & is_t(c3) &
  is_semicolon(c4):
  ex2 S1,S2,S3,S4:
  concat(S2,c1,c2) & concat(S3,c2,S2) &
  concat(S4,c3,S3) & concat(R,c4,S4);
pred prog_v6(var2 R)=
  ex2 S,X',Y':
  prog_uname(S) &
  (all1 x: (x in X'<=> ex2 X: x in X substr(X, S) & prog_v4(X))) &
  (all1 y: (y in Y'<=>ex2 Y: y in Y substr(Y, R) & prog_v5(Y))) &
  R/Y'=S/X';
pred Spec(var2 P)=
  all1 p where p in P: ~is_lt({p});
var2 S;
prog_v6(S)=>Spec(S);

In the above, prog_x corresponds to $prog_x$ and is_a(c) corresponds to an expression "a"(c). Furthermore, ext1, all1, ex2, and all2 are quantifiers for the first-order variables and second-order variables, respectively.

The following is a Java™ program for outputting a string value updated according to a regular expression operation:

```
static public void main(String args[]){
  String s = args[0];
  s = s.replaceAll("(ab)+", "z")
  System.out.println(s);
}
```

The corresponding SSA form for the above is as follows:
G=(N, E)
N={b₁,b₂}
E={(b₁, b₂)}
b₁=(1, BB₁)
b₂=(2, BB₂)
BB₁=
   s=undefined;
   v1="(ab)*";
   v2="z";
   v3=replaceAll(s,v1,v2);
   System.out.println(v3)
BB₂=φ

The MONA predicate declarations corresponding to the above SSA form are obtained as follows:
   include "sa.mona";
   pred prog_v1(var2 R)=
   ex2 P: min(R) in P & max(R)+1 in P &
   all1 r,r': all2 S: consecutive(r,r',P) & strr(S,R,r,r')=>is_ab
     (S);
   pred prog_v2(var2 R)=is_z(R);
   var2 Xs;
   pred prog_s(var2 R)=R=Xs;
   pred prog_v3(var2 R)=
   ex2 S,X',Y':
   prog_args0(S) &
   (all1 x: (x in X'<=> ex2 X: x in X & substr(X, S) &
     prog_v1(X))) &
   (all 1 y: (y in Y'<=> ex2 Y: y in Y & substr(Y, R) &
     prog_v2(Y))) &
   R¥Y'=S¥X';
   pred Spec(var2 P)=
   ~(ex2 S: substr(S,P) & is_ab(S));
   var2 V3;
   prog_v3(V3)=>Spec(V3);

In the above, prog_v1 is a predicate representing the regular expression "(ab)*."

The following SSA form has a cyclic variable v2. A control flow graph is omitted here for convenience.
   v0="ab"
   v1="ab"
   v2=phi(v0,v3)
   v3=v2+v1

A string value which can be taken by v2 is expressed by the following context-free grammar:
   v2→v0|v2
   v3→v2 v1

The context-free grammar can be approximated with a regular expression v0 v1* and therefore the following MONA prpogram is obtained:
   pred prog_v0(var2 R)=is_ab(R);
   pred prog_v1(var2 R)=is_ab(R);
   pred prog_v2(var2 R)=
   ex2 V0,V1 Star:
   prog_v1 (V0) &
   (ex2 P: min(V1 Star) in P & max(V1Star)+1 in P &
   all1 r,r'; all2 S: consecutive(r,r',P) &
     strr(S,V1Star,r,r')=>prog_v1(S)) &
   concat(R, V0, V1 Star);
   pred prog_v3(var2 R)=
   ex2 V1,V2:
     prog_v2(V2) & prog_v1(V1) & concat(R, V2, V1);

The following SSA program has an indexOf method. Note that the control flow is also omitted here.
   v0=0;
   v1="ab";
   v2="b";
   v3=indexOf(v1,v2);
   v4=substring(v1,v0,v3);

The above is converted into the following MONA program:
   include "sa.mona";
   pred prog_v0(var1 n, var2 S)=pos0(n,S);
   pred prog_v1(var2 R)=is_ab(R);
   pred prog_v2(var2 R)=is_b(R);
   pred prog_v3(var1 n0, var2 S0)=
   (ex2 S1: prog_v2(S1) & indexOf(n0, S0, S1)) &
   (all2 S1: all1 m:
     prog_v2(S1) & indexOf(m,S0,S1)=>n0<=m);
   pred prog_v4(var2 R)=
   ex2 V1: ex1 v0,v3:
   prog_v0(v0,V1) & prog_v1 (V1) & prog_v3(v3,V1) &
   substrr(R, V1, v0, v3);
   pred Spec(var2 R)=
   all2 R': R' sub R=>~is_b(R');
   var2 R;
   prog_v4(R)=>Spec(R);

The following SSA program has a loop. Note that the control flow is also omitted here.
   v1= . . . .
   v2="a"
   v3="b"
   v4=replace(v5,v2,v3)
   v5=phi(v1,v4)

The above is converted into the following MONA program:
   include "sa.mona";
   # R is a string constructed from a character
   # set S by selecting positions.
   # Ex.: Suppose w="abc", S={0,1,2}, then
   # R={0}|{2}|{0,1}|{0,2}|{1,2}|{0,1,2}
   pred construct(var2 R, S)=R sub S|R=S;
   var2 CSv5;
   var2 args0;
   pred inv_v5(var2 R)=construct(R, CSv5);
   pred prog_v1(var2 R)=is_b(R);
   pred prog_v2(var2 R)=is_a(R);
   pred prog_v3(var2 R)=is_b(R);
   pred prog_v4(var2 R)=
   ex2 S,X',Y':
   inv_v5(S) &
   (all1 x:
     (x in X'<=> ex2 X: x in X &
     substr(X, S) & prog_v2(X))) &
   (all1 y:
     (y in Y'<=> ex2 Y: y in Y &
     substr(Y, R) & prog_v3(Y))) &
   (R¥Y' sub S¥X');
   pred prog_v5(var2 R)=
     prog_v1(R)|prog_v4(R);
   pred SpecA(var2 P)=
   all1 p where p in P:~is_a({p});
   (all2 R: prog_v5(R)=>inv_v5(R))
     =>all2 S: prog_v5(S)=>SpecA(S);

Although the present invention has been described hereinabove by way of embodiments thereof, it will be apparent to those skilled in the art that various modifications or improvements can be applied to the above-described embodiments and such modifications or improvements should be included within a technical scope of the present invention. For example, the present invention does not depend on a particular computer architecture or a platform such as an OS.

Moreover, the present invention is not limited to Java™, but applicable to a source code of an arbitrary computer language in which strings are handled. In this case, preferably the source code is converted once to the SSA form, while it is also possible to convert the source code of the computer language directly to the M2L format.

Moreover, although MONA is used as the M2L solver in this embodiment, the M2L solver is not limited thereto, but an arbitrary M2L solver usable in the platform can be used.

As will be appreciated by those skilled in the art, aspects of the present invention may be embodied as a system or method (as described above) or as a computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

A combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or a suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or a suitable combination of the foregoing. A computer readable storage medium may be a tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms, including, but not limited to, electro-magnetic, optical, or a suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or a suitable combination of the foregoing.

Computer program code for carrying out operations for aspects of the present invention may be written in one programming language or in a combination of two or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of determining the validity of a string generated by a computer programming language program without executing said program, said method comprising the steps of:
    abstracting, with a processor, a constraint between variables extracted from a source code for a programming language, wherein said variables include a string declaration and the definition of each said variable is unique, describing said constraint in M2L, and storing said constraint into a computer storage unit; and
    evaluating the validity of said string on an M2L solver on the basis of said constraint on said variables and a M2L specification to determine whether said string is safe or unsafe, wherein a string value with a safe or unsafe pattern is prepared in advance and stored in said computer storage unit.

2. The method according to claim 1, wherein said programming language is in SSA form.

3. The method according to claim 1, wherein said programming language is Java.

4. A computer program product for determining the validity of a string generated by a computer programming language program without executing said program, said computer program product comprising computer program instructions for carrying out the steps of:
    abstracting, with a processor, a constraint between variables extracted from a source code for a programming language, wherein said variables include a string declaration and the definition of each said variable is unique, describing said constraint in M2L, and storing said constraint into a computer storage unit; and
    evaluating the validity of said string on an M2L solver on the basis of said constraints on said variables and a M2L specification to determine whether said string is safe or unsafe, wherein a string value with a safe or unsafe pattern is prepared in advance and stored in said computer storage unit.

5. The computer program product according to claim 4, wherein said programming language is in SSA form.

6. The computer program product according to claim 4, wherein said programming language is Java.

7. A computer-implemented system for determining the validity of a string generated by a computer programming language program without executing said program, said system comprising:

a computer storage unit;

a processor implemented abstraction unit for abstracting a constraint on variables extracted from a source code for a programming language, wherein said variables include a string declaration and the definition of each said variable is unique, describing said constraint in M2L, and storing said constraint into said computer storage unit;

a processor implemented specification preparation unit for preparing a specification containing a string value with a safe or unsafe pattern in M2L and storing said specification into said computer storage unit; and a processor implemented string evaluation unit for evaluating the validity of said declared string by employing an M2L solver function and using said constraints on said variables and said specification to determine whether said declared string is safe or unsafe.

8. The system according to claim 7, wherein said programming language is in SSA form.

9. The system according to claim 7, wherein said programming language is Java.

* * * * *